R. C. LANPHIER & O. WHITE.
MERCURY MOTOR METER.
APPLICATION FILED AUG. 20, 1908.
911,020.
Patented Jan. 26, 1909.
2 SHEETS—SHEET 1.
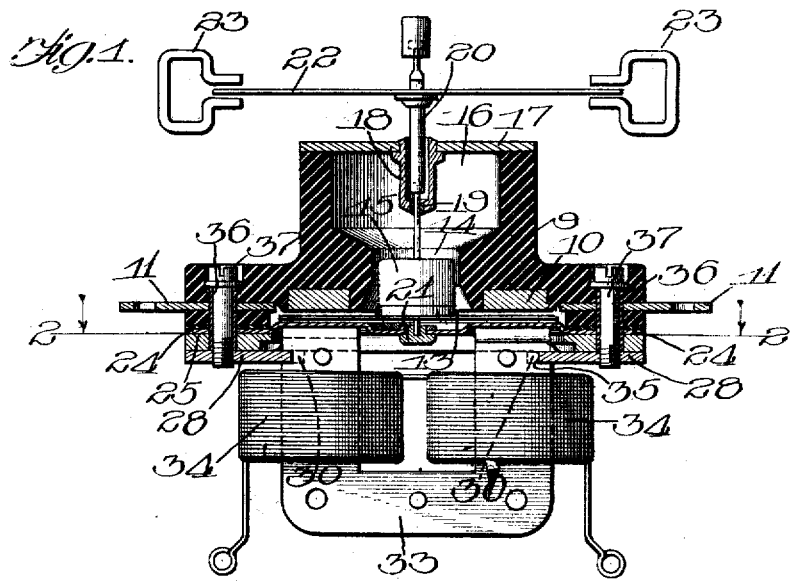
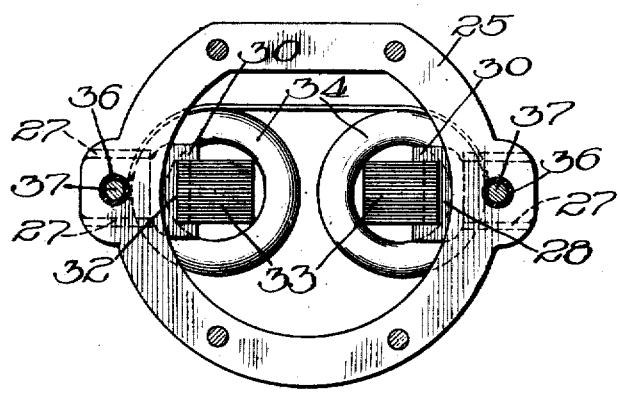
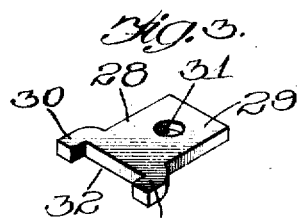
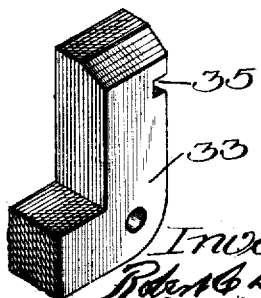

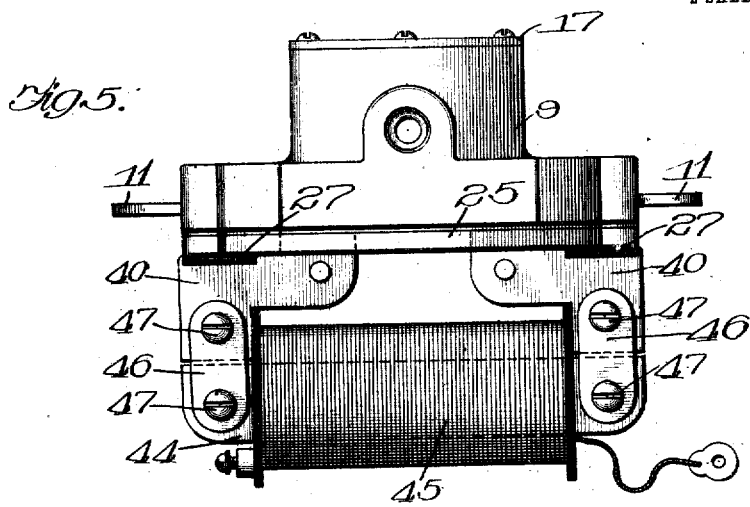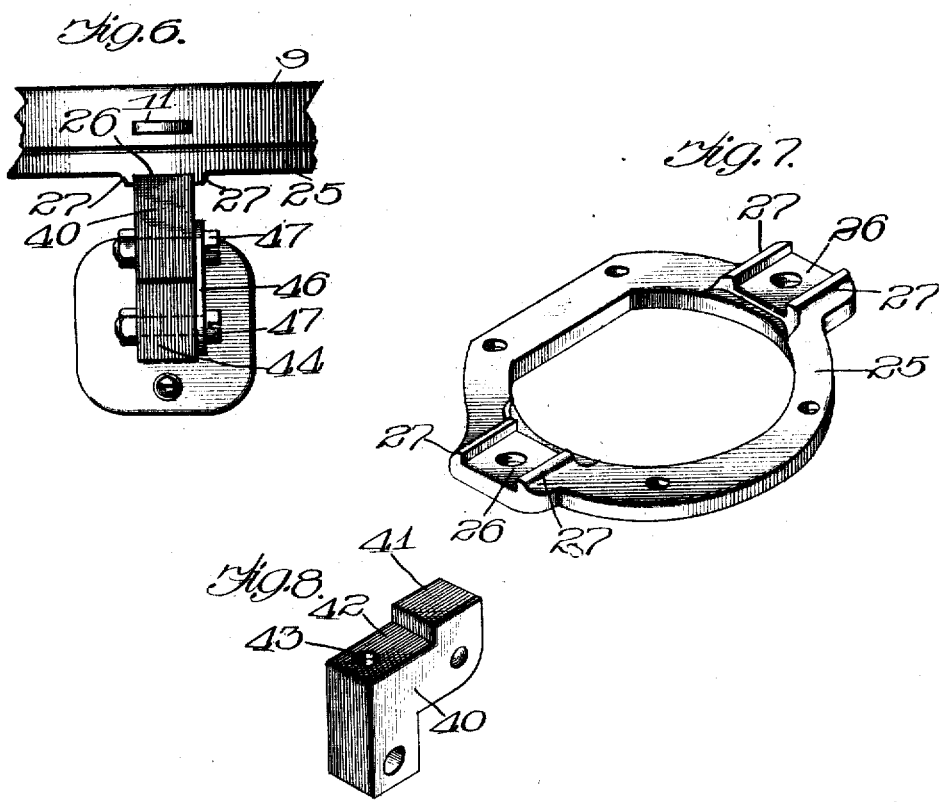

UNITED STATES PATENT OFFICE.

ROBERT C. LANPHIER AND OTIS WHITE, OF SPRINGFIELD, ILLINOIS, ASSIGNORS TO SANGAMO ELECTRIC COMPANY, OF SPRINGFIELD, ILLINOIS, A CORPORATION OF ILLINOIS.

MERCURY-MOTOR METER.

No. 911,020.　　　Specification of Letters Patent.　　　Patented Jan. 26, 1909.

Application filed August 20, 1908. Serial No. 449,487.

*To all whom it may concern:*

Be it known that we, ROBERT C. LANPHIER and OTIS WHITE, citizens of the United States, residing at Springfield, in the county of Sangamon, State of Illinois, have invented certain new and useful Improvements in Mercury-Motor Meters, of which the following is a specification, reference being had to the accompanying drawings.

Our invention relates to improvements in meters of the mercury motor type and its principal object is to supply a new and improved armature casing and energizing magnet support for meters of this type, and our invention, while particularly adapted for an alternating current mercury motor meter of the type and method of operation shown in Letters Patent to said Lanphier, No. 843,155, is also adapted for use in direct current mercury motor meters.

Heretofore in mercury motor meters it had been customary to form the armature casing in which the armature chamber is formed of two parts, formed of pressed or molded material, the top piece carrying molded therein a soft steel return plate for the magnetic field derived from the field magnet below the armature, and having the upper portion of the same piece formed into a hopper or opening into which mercury is poured for filling the chamber, the opening being covered with a suitable metal cap and provided with a jewel and so arranged as to prevent the spilling of the mercury. The bottom part of the casing has also been formed of a pressed or molded piece of insulating non-magnetic material in which have been embedded laminated pole-pieces which pass through the bottom portion into the armature chamber in order to bring the magnetic field close to the armature. The copper contacts for carrying the current to and from the armature have also been molded in one or the other,—usually in the bottom one,—of said molded parts, and the two portions have been held together by suitable screws passing through one part and entering metal screw-threaded bushings molded in the other part. The two parts forming the casing have been so shaped that when put together a shallow circular chamber for the armature is formed. This construction has involved some difficulties, particularly in making a mercury-tight joint between the two pieces. Furthermore, on account of the inevitable variation in the exact position of the pole-pieces, arising from their being molded into the lower member of the casing, and the variation in the exact diameters of the upper and lower molded pieces where they fit together, it has been difficult to get an absolutely accurate alinement between the two pieces. This rendered it also difficult to get an exact alinement of the upper and lower jewel bearings for the armature spindle, which of course is necessary for perfect operation of the meter. Furthermore, in such meters, the use of the two pole pieces molded into the lower member of the armature casing has necessitated a separate yoke to carry the coil of the field magnet. While this produces no difficulty in meters of the direct current type, difficulties arise with an alternating current meter, owing to the necessary breaks between the yoke and the pole pieces.

In an alternating current meter of the type referred to above, the magnetizing coil is formed of somewhat heavy copper wire connected in series with the load, and the turns of this coil are relatively fewer in number than in a meter of the direct current type, in which the energizing coil is composed of a large number of turns of fine wire connected across the circuit, the load current passing across the armature. In the alternating current meter, therefore, the field magnet structure has to operate from zero magnetization up to the maximum produced by the series winding, and the presence of air-gaps and bends in the laminated magnet causes an error or falling off in the curve at light loads or at low values of the magnetizing current. Moreover, in the form of construction above referred to, having both the upper and lower parts of the armature casing formed of pressed or molded insulating material, the armature chamber was practically insulated at all parts from outside air by a composition which was a very poor heat conductor, thus preventing the escape into the air of heat caused by the heating of the armature due to current passing through it, causing the armature and mercury in the chamber to become more readily heated and interfering with the accuracy of the meter.

The object of our invention is to provide a construction which will do away with these difficulties, which will eliminate the necessity for such air-gaps in the series magnet of the alternating current meter, and by allowing the heat to be radiated into the air, to permit of the passage through the armature of a current of increased volume derived, as is shown in the Letters Patent above referred to, from the low potential secondary of a transformer, and thus largely eliminate the errors due from heating of the armature and the mercury. Furthermore, with our new and improved construction it is possible to accurately dowel and locate the metal bottom with respect to the molded top piece and also to dowel the entire motor element,— that is to say, the mercury chamber with armature and mercury,—to the base of the meter. Moreover, while, as we have said above, our improved construction is particularly adapted for an alternating current meter, it is also without any change adapted to readily receive a magnet of the old type consisting of a yoke carrying the energizing coil and two pole pieces secured thereto. The construction of the armature casing is therefore interchangeable, so far as the motor element is concerned, in the direct current and the alternating current meters.

In the accompanying drawings:—Figure 1 is an elevation, showing the armature casing in vertical section. Fig. 2 is a section on line 2—2 of Fig. 1. Fig. 3 is a detail, being an isometric view of one of the magnet-holding clips. Fig. 4 is a detail, showing a portion of the magnet broken away and with the coil removed. Fig. 5 is an elevation, showing the armature casing with the ordinary direct current energizing magnet mounted therein. Fig. 6 is an end view of the parts shown in Fig. 5. Fig. 7 is an isometric view of the binding ring by which the metallic bottom of the chamber is secured to the upper molded portion of the casing, seen from below. Fig. 8 is a detail, being an isometric view of one of the pole pieces of the magnet used for direct current meters.

Referring to the drawings:—9 indicates the upper member of the armature casing formed of molded or pressed insulating material and having embedded and molded in it a return plate 10 which is in the form of a ring of soft iron or steel.

11 indicates copper contacts which are molded in the upper member 9 and adapted to be connected either to the secondary of a low potential transformer in an alternating current meter of the type shown in the Letters Patent above referred to, or to the load circuit of a direct current meter.

The member 9 is provided with a circular recess 12, which, when closed in by the bottom above described, forms a mercury chamber adapted to contain the armature 13. The mercury chamber 12 opens centrally into a passage 14 adapted to receive a float 15 of the armature which opens up into a chamber 16.

17 indicates a plate which closes the top of the chamber 16 and is provided with a sleeve 18 extending into the chamber 16 and provided at its bottom with a jewel bearing 19.

20 indicates an armature spindle of the usual form which is journaled in the jewel bearing 19 and in a suitable bearing, as 21, in the bottom plate hereinafter described.

22 indicates a brake disk secured to the spindle 20, and 23 indicates permanent magnets which operate to brake the disk 22.

It will of course be understood that the spindle is connected with a suitable time train, which forms no part of our present invention and which, for clearness of illustration, is omitted from the drawings.

24 indicates a circular plate of the same diameter as the upper member 9 and which is pressed into suitable shape which when secured to the bottom of the upper member 9 as hereinafter described forms a bottom therefor and closes in the mercury chamber and supports the bearing 21 for the spindle 20. The plate 24 is formed of thin non-magnetic metal, and when used for an alternating current meter is formed of resistance metal in order to diminish the effect of eddy currents.

25 indicates a metallic ring of non-magnetic material,—preferably brass,—whose periphery is of the same shape as the periphery of the plate 24. The ring 25 (see Fig. 7) is provided with a pair of diametrically-opposed grooves 26 preferably formed by striking up parallel projections 27 from the under surface of the ring and adapted to receive the clips hereinafter described. The upper casing 9, the plate 24, and ring 25 are provided with a plurality of registering openings adapted to receive bushings for the screws hereinafter described.

28 indicates clips of a shape best shown in Fig. 3. These clips are provided with a body portion 29, and projecting lugs 30 upon the end. The body portion 29 is adapted to fit closely within the grooves 26 and rest snugly therein and is provided with a screw-threaded opening 31. The lugs 30 project so as to straddle the ends of the magnet, and the end of the clip 32, lying between the lugs 30, is adapted to enter a suitable notch near the pole of the magnet hereinafter described.

33 indicates a laminated magnet formed of soft steel plates and of a U-shape.

34 indicates energizing coils upon the magnet adapted to be connected to the load circuit of an alternating current meter of the type described in the above-mentioned Letters Patent. These coils are slid upon the pole ends of the U-shaped magnet 33. Near the top of each pole piece of the magnet is provided a transverse groove 35 adapted to receive the end 32 of the clip 28.

36 indicates bushings which pass through suitable openings in the upper member 9, plate 24, and ring 25, and support screws 37 which enter screw-threaded openings 26 in the ring 25. Other openings in the ring 25 are screw-threaded to receive other screws which pass through the parts in the same manner so as to bind tightly together the upper member 9, the plate 24 and the ring 25.

These parts being suitably fastened together with the armature in position, the clips 28 are placed with their ends 32 in the notches 35 of the magnet 33 into which they closely fit. The body portions of the clips are then located in the grooves 26 of the ring 25, and, by means of the screws 37, the clips 28 and the magnet 33 are tightly secured in position below the mercury casing with the poles of the magnet close below the plate 24.

The plate 24 being formed of metal, as above stated, will easily radiate the heat caused by the passage of the current through the armature chamber, thus permitting the heat to escape and permitting the passage across the armature of a volume of current derived from the step-down secondary of a low potential transformer in the manner described in said Letters Patent larger than what would be permitted without causing a temperature error if the casing were formed of non-heat-conducting molded material as above described. It will be obvious, also, that by means of suitable dowel pins (not shown) and of the ordinary construction and operation, the several parts may be accurately adjusted together in proper alinement and ready to be fastened together by screws as above described.

By the removal of the clips, it will be obvious that the same casing as above described may be used for a direct current meter having an energizing magnet of the original type. This will be seen by a reference to Figs. 5, 6 and 8. In these figures, 40 indicates pole pieces which are preferably laminated and formed of plates of soft metal and which are bent at right angles with slightly projecting poles 41 and having a plane surface 42 adapted to fit into the recess 26 of the ring 25 and secured thereto by the screws 37 passing into screw-threaded openings 43. 44 indicates a yoke upon which is mounted the energizing coil 45 formed of a large number of turns of fine wire and adapted to be connected across the circuit in the ordinary manner in direct current meters of this type. The yoke 44 is secured to the pole pieces 40 by suitable clips 46 and screws 47. It is obvious from the above description that in case it is desired to use the mercury casing above described for a direct current meter, the clips 28 are not used and therefore an energizing magnet of ordinary construction consisting of two pole pieces and a yoke upon which the energizing coil is mounted may be mounted upon the meter without in any way changing the armature-casing.

What we claim as our invention and desire to secure by Letters Patent is:—

1. In a mercury motor meter, an armature casing composed of an upper member of insulating material having a circular recess adapted to receive an armature, a lower member composed of a thin plate of non-magnetic material, a clamping ring, and means for clamping said upper member, said lower member and said clamping ring firmly together.

2. In a mercury motor meter, the combination with an armature chamber consisting of an upper member of insulating material recessed to form an armature chamber, and a lower member composed of a plate of thin non-magnetic material, of a return plate molded in said upper member, a clamping ring, means for clamping said lower member between said clamping ring and said upper member, an energizing magnet, and means carried by said clamping ring and adapted to removably support the magnet therefrom.

3. In a mercury motor meter, the combination with an armature chamber consisting of an upper member of insulating material recessed to form an armature chamber, and a lower member composed of a plate of thin non-magnetic material, of a return plate molded in said upper member, a clamping ring of non-magnetic metal adapted to clamp said upper and lower members together, grooves on said clamping ring, clips adapted to enter said grooves, screws adapted to secure said clips in said grooves, and an energizing magnet adapted to be engaged by said clips and supported thereby.

4. In a mercury motor meter, the combination with an armature chamber consisting of an upper member of insulating material recessed to form an armature chamber, and a lower member composed of a plate of thin non-magnetic material, of a return plate molded in said upper member, a clamping ring of non-magnetic metal adapted to clamp said upper and lower members together, grooves on said clamping ring, a U-shaped energizing magnet provided with slots on the outer surfaces of its poles, clips adapted to enter said slots and embrace the sides of the magnet and having a body portion adapted to fit the grooves in said clamping ring, and screws adapted to engage said clips and removably secure the same in said grooves.

ROBERT C. LANPHIER.
OTIS WHITE.

Witnesses:
J. H. HODDE,
F. W. MORGAN.